United States Patent
Ren et al.

(10) Patent No.: US 10,703,890 B2
(45) Date of Patent: Jul. 7, 2020

(54) COMPOSITIONS AND METHODS FOR MAKING CROSSLINKED POLYOLEFINS WITH PEROXIDE INITIATOR

(71) Applicant: Dow Global Technologies LLC, Midland, MI (US)

(72) Inventors: Dakai Ren, Midland, MI (US); Kyoung moo Koh, Midland, MI (US); Thomas H. Peterson, Midland, MI (US); Tanya N Singh-Rachford, Marlborough, MA (US); Mark A. Rickard, Midland, MI (US); Jeffrey M. Cogen, Collegeville, PA (US); Yabin Sun, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 118 days.

(21) Appl. No.: 15/738,325

(22) PCT Filed: Jun. 29, 2015

(86) PCT No.: PCT/CN2015/082653
§ 371 (c)(1),
(2) Date: Dec. 20, 2017

(87) PCT Pub. No.: WO2017/000121
PCT Pub. Date: Jan. 5, 2017

(65) Prior Publication Data
US 2018/0163034 A1   Jun. 14, 2018

(51) Int. Cl.
| | |
|---|---|
| C08F 210/02 | (2006.01) |
| C08F 220/06 | (2006.01) |
| C08F 222/06 | (2006.01) |
| C08K 5/14 | (2006.01) |
| C08L 23/08 | (2006.01) |
| H01B 3/44 | (2006.01) |
| H01B 3/40 | (2006.01) |
| C08G 81/02 | (2006.01) |
| C08F 299/00 | (2006.01) |

(52) U.S. Cl.
CPC ........ *C08L 23/0884* (2013.01); *C08F 210/02* (2013.01); *C08F 220/06* (2013.01); *C08F 222/06* (2013.01); *C08F 299/00* (2013.01); *C08G 81/021* (2013.01); *C08K 5/14* (2013.01); *C08L 23/0869* (2013.01); *H01B 3/40* (2013.01); *H01B 3/441* (2013.01); *H01B 3/447* (2013.01); *C08L 2203/202* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 4,857,600 | A | 8/1989 | Gross et al. |
| 5,462,975 | A | 10/1995 | Yamamoto et al. |
| 5,575,965 | A | 11/1996 | Caronia et al. |
| 6,528,550 | B1 | 3/2003 | Hsu et al. |
| 6,774,188 | B1 | 8/2004 | Robert et al. |
| 2002/0197495 | A1 | 12/2002 | Tamura et al. |
| 2008/0053696 | A1 | 3/2008 | Nakayama et al. |
| 2009/0239962 | A1 | 9/2009 | Dobashi |
| 2011/0195210 | A1 | 8/2011 | Li et al. |
| 2012/0157688 | A1 | 6/2012 | Rajendran |
| 2013/0220666 | A1 | 8/2013 | Fagrell et al. |
| 2014/0329091 | A1 | 11/2014 | Cogen et al. |
| 2015/0310962 | A1 | 10/2015 | Touge |

FOREIGN PATENT DOCUMENTS

| | | |
|---|---|---|
| EP | 0651009 A1 | 5/1995 |
| JP | S62-141019 A | 6/1987 |
| JP | S62-224920 A | 10/1987 |
| WO | 2005/047393 A1 | 5/2005 |
| WO | WO-2013091575 A1 * | 6/2013 |
| WO | WO-2014106928 A1 * | 7/2014 |

* cited by examiner

Primary Examiner — Irina S Zemel
Assistant Examiner — Jeffrey S Lenihan
(74) Attorney, Agent, or Firm — Quarles & Brady LLP

(57) ABSTRACT

Crosslinkable interpolymer blends comprising ethylene monomer residues, residues of comonomers having carboxylic acid and/or carboxylic acid anhydride functionality, and residues of comonomers having epoxide functionality, a peroxide initiator, and optionally a crosslinking catalyst, which, in embodiments, cure to a gel content of greater than (>) 50 wt % within less than 1.5 minutes at 200~C, and require little or no degassing after crosslinking.

19 Claims, 1 Drawing Sheet

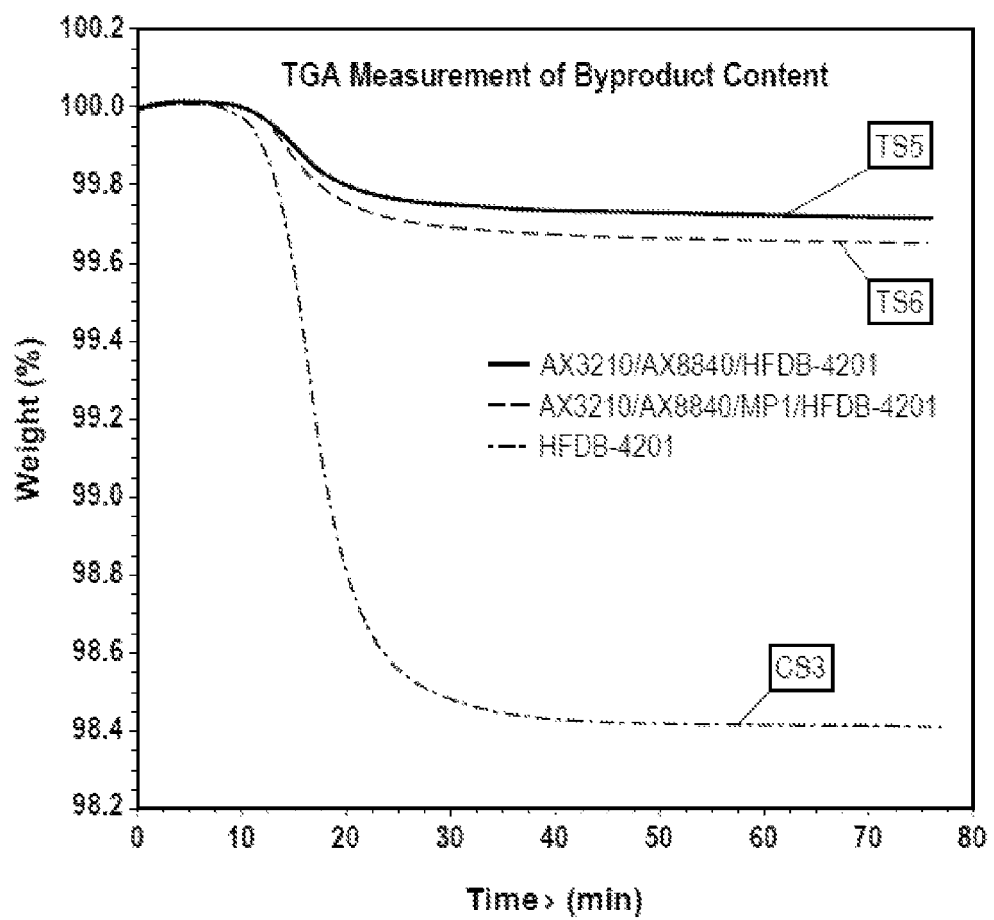

COMPOSITIONS AND METHODS FOR MAKING CROSSLINKED POLYOLEFINS WITH PEROXIDE INITIATOR

FIELD

Embodiments of this invention relate to interpolymer blends that are crosslinked using a hybrid curing system comprising peroxide and epoxy/anhydride initiated crosslinking reactions, and are suitable for use as insulation material for wire and cable applications.

BACKGROUND

Medium, high, and extra-high voltage ("MV," "HV," and "EHV") cables typically contain a peroxide cross-linked polyethylene material as an insulation layer. The incumbent process for cable manufacture involves the extrusion of the peroxide-imbibed low density polyethylene (LDPE) as the insulation layer onto a suitable conductor at a temperature where the peroxide reaction is minimal to maintain good processability, the average temperature being about 140° C. Subsequently, the cable core is conveyed through a vulcanization unit at elevated temperature, which averages about 200° C., resulting in crosslinking of the LDPE insulation material in a few minutes. After cooling, the cable core is taken up on spools for subsequent processing.

Although crosslinking provides valuable improvement in the thermomechanical properties of the material, the peroxide used for crosslinking creates byproducts that require removal from the material after it is formed into an insulation layer (e.g., by degassing) but before a jacketing layer is placed over the insulation layer. In the case of dicumyl peroxide, these byproducts include methane, acetophenone, alpha methylstyrene, and cumyl alcohol. Although work has been undertaken to discover an insulation material that does not require degassing, no viable solution has been identified to date.

A technique has been described for crosslinking polyethylene via a catalyst-aided epoxy-anhydride reaction that can reduce more than 70% of the volatile byproducts in the crosslinked material. However, achieving a suitable balance of cure rate at the disclosed 175° C. to 260° C. curing temperature and scorch retardance at 140° C. is problematic, being either considerably slower in cure rate or considerably more prone to scorch than incumbent peroxide initiated systems.

Accordingly, a need remains for a crosslinkable material suitable for use in wire and cable applications that can be produced at an acceptable cure rate at the vulcanization stage without compromising processability at extrusion stage, and requires little or no degassing after crosslinking of the material.

SUMMARY

In various embodiments, the invention provides a composition comprising:

A. a first interpolymer or oligomer comprising ethylene monomer residues and residues of a first comonomer having one or more functionalities selected from the group consisting of carboxylic acid and carboxylic acid anhydride;

B. a second interpolymer or oligomer comprising ethylene monomer residues and residues of a second comonomer having epoxide functionality; and C. a peroxide free-radical initiator.

In embodiments, the composition comprises a catalyst.

In another aspect, the invention provides a crosslinked composition formed from the composition as disclosed herein. In embodiments, the crosslinked composition has a volatiles content of less than 1.0 wt %.

In another aspect, the invention provides an article comprising at least one component formed from the composition as disclosed herein. In an embodiment, the article is an insulated cable comprising a conductor, and an insulation material comprising an at least partially crosslinked polymeric network comprising the composition as disclosed herein.

In yet another aspect, the invention provides a process for preparing a crosslinked insulation material by crosslinking at least a portion of a crosslinkable material comprising the composition as disclosed herein and a catalyst, at a temperature of 175° C. to 260° C. to provide a crosslinked insulation material.

A composition, article and/or process can comprise a combination of two or more embodiments described herein.

BRIEF DESCRIPTION OF THE DRAWINGS

The FIGURE is a graph reporting the results of TGA measurements of byproduct (volatiles) content of samples CS3, TS5 and TS6) in Study 2.

DETAILED DESCRIPTION

Various embodiments of the present invention relate to a hybrid composition comprising a blend of epoxy- and anhydride-grafted polymers designed to be cured through peroxide and epoxy/anhydride initiated crosslinking reactions. An amount of peroxide is added to the epoxy- and anhydride-grafted polymer blends to accelerate the cure rate while reducing the volatile byproducts by more than 70% versus levels found in prior art compositions that are cured with peroxide only.

In embodiments, the interpolymer blends, which include a peroxide initiator and crosslinking catalyst, when subjected to crosslinking conditions at 200° C., cure to a gel content of greater than (>) 60 wt % within less than 1.13 minutes, as determined by the method described in ASTM D2765.

The composition and process can be employed in a variety of commercial applications, including, but not limited to, insulation and jacketing applications for wires and cables.

Ethylene-Based Interpolymers

In various embodiments, the composition comprises at least two types of ethylene-based interpolymers. Each of the first and second interpolymers comprise ethylene monomer residues. A first interpolymer comprises residues of a first comonomer having one or more functionalities selected from the group consisting of carboxylic acid and carboxylic acid anhydride. A second interpolymer comprises residues of a second comonomer having epoxide functionality.

In embodiments, the ethylene monomer of an interpolymer constitutes at least 50 weight percent ("wt %") of the entire α-olefin content of the interpolymer. In embodiments, the ethylene monomer can constitute at least 60 wt %, at least 70 wt %, at least 80 wt %, at least 90 wt %, at least 95 wt %, at least 99 wt %, or up to 100 wt % of the total α-olefin monomer content of the interpolymer. In embodiments, the ethylene monomer can constitute substantially all of the total α-olefin monomer content of the interpolymer.

In embodiments, the first interpolymer has an anhydride content of from 0.1 to 10 wt %; and the second interpolymer has an epoxide content of from 0.1 to 10 wt %. In embodiments, the epoxide to anhydride molar ratio ranges from 12:1 to 1:12. In embodiments, the number average molecular weight of each of the first and second interpolymers is from 1,000 to 500,000.

In addition, the first and second interpolymers can optionally further comprise additional comonomer residues. Examples of such optional comonomers include alpha-olefins (α-olefins), dienes, vinyl silanes, unsaturated esters (e.g., ethyl acrylate), and acetates (e.g., vinyl acetate). In embodiments, the first and/or second interpolymer includes one or more α-olefin comonomer residues. In embodiments, the α-olefin comonomer can be any $C_3$-$C_{20}$ α-olefin monomer, $C_3$-$C_{12}$ α-olefin monomer, or $C_3$-$C_5$ α-olefin monomer. Examples of such α-olefin monomers include, but are not limited to, propylene, 1-butene, 1-pentene, 4-methyl-1-pentene, 1-hexene, 1-octene, 1-decease, 1-dodecene, 1-tetradecene, 1-hexadecene, and 1-octadecene, among others. The α-olefins can also contain a cyclic structure such as cyclohexane or cyclopentane, resulting in an α-olefin such as 3-cyclohexyl-1-propene (allyl cyclohexane) and vinyl cyclohexane. In embodiments, the α-olefin comonomer can be selected from the group consisting of propylene, 1-butene, and mixtures thereof. Such optional monomer residues can be present in an amount ranging from 1 to 40 wt %, or from 5 to 20 wt %.

First Interpolymer

In addition to ethylene monomer residues, the first interpolymer comprises residues of a first comonomer having one or more functionalities selected from the group consisting of carboxylic acid and carboxylic acid anhydride. Additionally, the first comonomer can have at least one site of unsaturation to allow the first comonomer to polymerize. Illustrative examples of comonomers having carboxylic acid functionality include acrylic acid and methacrylic acid, among others, and higher-order homologues thereof. An example of a comonomer having carboxylic anhydride functionality is maleic anhydride, among others. In embodiments, the first comonomer is selected from the group consisting of acrylic acid, maleic anhydride, and mixtures thereof. In some embodiments, the first comonomer is acrylic acid. In some embodiments, the first comonomer is maleic anhydride.

In embodiments, the first interpolymer can comprise the first comonomer in an amount of at least 0.5 wt %, at least 1 wt %, or at least 2 wt %, based on the total weight of the first interpolymer. In embodiments, the first interpolymer can comprise the first comonomer in an amount ranging from 0.5 to 10 wt %, 1 to 5 wt %, or 2 to 4 wt %. The amount of the first comonomer can be confirmed via analytical methods known in the art, such as, but not limited to, Fourier transform infrared spectroscopy, nuclear magnetic resonance, and differential scanning calorimetry. In embodiments, ethylene monomer residues constitute all (i.e., 100 wt %) or substantially all of the remainder of the first interpolymer.

In embodiments, the first interpolymer has a melt index ("$I_2$") in the range of from 1 to 50 dg/min., or in the range of from 2 to 7 dg/min., as determined according to ASTM D-1238 (190° C./2.16 kg). In embodiments, the first interpolymer has a density in the range of from 0.85 to 0.97 g/cm³, or in the range of from 0.86 to 0.93 g/cm³, as determined according to ASTM D-792. In embodiments, the first interpolymer has a polydispersity index (i.e., weight average molecular weight/number average molecular weight, "Mw/Mn" or molecular weight distribution ("MWD")) in the range of from 1.5 to 20, or in the range of from 3 to 15, as determined by gel permeation chromatography.

An example of a commercially available interpolymer suitable for use as the first interpolymer is Lotader™ 3210, which is an anhydride-functionalized polyethylene (poly (ethylene-co-butyl acrylate-co-maleic anhydride random terpolymer), available from Arkema, Inc.

Second Interpolymer

In addition to ethylene monomer residues, the second interpolymer comprises residues of a second comonomer having epoxide functionality. In embodiments, the second comonomer comprises at least one epoxide functional group. Additionally, the second comonomer can have at least one site of unsaturation to allow the second comonomer to polymerize. Illustrative examples of comonomers having epoxide functionality include glycidyl esters of carboxylic acids, such as esters of acrylic acid or methacrylic acid, among others, and higher-order homologues thereof. In embodiments, unsaturated glycidyl ethers may be employed as at least a portion of the second comonomer. Exemplary comonomers having epoxide functionality include glycidyl acrylate, glycidyl methacrylate, and allyl glycidyl ether. In some embodiments, the second comonomer is glycidyl methacrylate.

In embodiments, the second interpolymer comprises the second comonomer in an amount of at least 0.5 wt %, at least 3 wt %, or at least 7 wt %, based on the total second interpolymer weight. In embodiments, the second interpolymer can comprise the second comonomer in an amount ranging from 0.5 to 20 wt %, 3 to 10 wt %, or 7 to 9 wt %. In various embodiments, ethylene monomer residues constitute all or substantially all of the remainder of the second interpolymer. In embodiments, ethylene monomer residues constitute all (i.e., 100 wt %) or substantially all of the remainder of the second interpolymer.

In embodiments, the second interpolymer has a melt index ("$I_2$") in the range of from 1 to 50 dg/min., or in the range of from 2 to 7 dg/min., as determined according to ASTM D-1238 (190° C./2.16 kg). In embodiments, the second interpolymer has a density in the range of from 0.85 to 0.97 g/cm³, or in the range of from 0.86 to 0.93 g/cm³, as determined according to ASTM D-792. In embodiments, the second interpolymer has a polydispersity index in the range of from 1.5 to 20, or in the range of from 3 to 15, as determined by gel permeation chromatography.

An example of a commercially available interpolymer suitable for use as the second interpolymer is Lotader™ AX 8840, which is an epoxy-functionalized polyethylene (poly (ethylene-co-glycidyl methacrylate) random copolymer), available from Arkema, Inc.

Any methods known or hereafter discovered for preparing an interpolymer can be employed to make the first and second interpolymers having the respective compositions described herein. In embodiments, the interpolymers can be prepared using processes known for making a high pressure low density polyethylene ("HP LDPE"). One conventional high pressure process is described in Introduction to Polymer Chemistry, Stille, Wiley and Sons, New York, 1962, pages 149 to 151. High pressure processes are typically free-radical initiated polymerizations conducted in a tubular reactor or a stirred autoclave. In such cases, the first and second comonomer residues are incorporated during polymerization of the first and second interpolymers, respectively. In other embodiments, the first and second comonomer residues can be incorporated by a grafting process. For example, an ethylene polymer, such as LDPE, can be melt mixed with one or more of the described first and/or second comonomers (e.g., maleic anhydride, acrylic acid, allyl glycidyl ether, glycidyl methacrylate, etc.) in the presence of a peroxide or other free radical initiator to form the interpolymers comprising first and second comonomers.

In embodiments, the interpolymer is prepared using a free-radical initiated low density polyethylene-based polymerization reaction. Besides feeding the ethylene and various comonomers as described herein, other components can be fed to the reactor to initiate and support the free-radical reaction as the interpolymer is formed, such as reaction initiators, catalysts, and chain transfer agents as known and used in the art.

Free-Radical Initiator

In various embodiments, the blend of the first and second interpolymers is cured through free-radical and epoxy/anhydride initiated crosslinking reactions.

In embodiments, the first and second interpolymers are combined with a peroxide free radical initiator ("peroxide initiator").

Examples of peroxide initiators include, but are not limited to, dicumyl peroxide, 2,5-Bis(tert-butylperoxy)-2,5-dimethylhexane, Bis(tert-butyldioxyisopropyl)benzene, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, 2,5-dimethyl-2,5-di(tert-butyl peroxy)-3-hexyne, lauryl peroxide, and tert-butyl peracetate, among others. In embodiments, the peroxide initiator is selected from the group consisting of dicumyl peroxide, 2,5-Bis(tert-butylperoxy)-2,5-dimethylhexane, and Bis(tert-butyldioxyisopropyl) benzene. In embodiments, the free-radical initiator is dicumyl peroxide.

In embodiments, the concentration of the peroxide initiator is 0.005 or greater, or greater than (>) 0.05, or >0.1, or >0.16, or >0.25, or >0.5, or >1, or up to 1.2, or up to 0.4, wt %, based on the total weight of the composition. In embodiments, the concentration of the peroxide initiator is 0.005 to 1.2, or ≥0.05 to <1.2 wt %, or from 0.1 to 0.4 wt %, based on the total weight of the composition. In embodiments, the concentration of the peroxide initiator is >0.16 to 1.2 wt %, based on the total weight of the composition.

Crosslinking Catalysts

In various embodiments, the interpolymer blend can undergo crosslinking to form an at least partially crosslinked polymeric network. In such embodiments, the blend of the first and second interpolymers and peroxide initiator can be combined with a crosslinking catalyst to aid in crosslinking.

Crosslinking catalysts useful in the present invention include catalysts commonly used for curing epoxy resins, including, but not limited to, amines, imidazoles, substituted imidazoles, imidazoliums, substituted imidazoliums, phosphines, phosphoniums, ammonium compounds, among others. Examples of such crosslinking catalysts include tertiary amines such as triethylamine, tripropylamine, tributylamine, and benzyldimethylamine; substituted imidazoles such as 1-methylimidazole, 2-methylimidazole, and 4-methyl-2-phenylimidazole (MPI); substituted imidazoliums such as 3-ethyl-1-methylimidazolium chloride, 1,3 dimethylimidazolium chloride; phosphonium compounds such as ethyltriphenylphosphonium; ammonium compounds such as benzyltrimethylammonium chloride, among others, and mixtures thereof. In an embodiment, the crosslinking catalyst is 4-methyl-2-phenylimidazole (MPI).

Depending on the catalyst and reaction conditions, the catalyst can optionally co-react into the formulation.

In embodiments, the concentration of the crosslinking catalyst can range from 0.005, or from 0.01, or from 0.1, up to 2, or up to 1.5, or up to 1.2, or up to 1, wt %, based on the total weight of the composition. In embodiments, the crosslinking catalyst is present in an amount of 0.005 to 2 wt %, or 0.01 to 1.5 wt %, or 0.1 to 1 wt %, based on the total weight of the composition. In embodiments, the catalyst is present in an amount of 0.005 to 1.2 wt %, based on the total weight of the composition.

In embodiments, the catalyst to epoxide ratio ranges from 1:240 to 2:15.

Additives

In embodiments, the interpolymer blend composition can optionally include one or more compatible additives, including, but are not limited to, processing aids, fillers, antioxidants, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators, coagents, and colorants or pigments. Such additives can be employed in a desired amount to achieve their desired effect. Additives, other than fillers, are typically used in amounts ranging from 0.01 or less to 10 or more wt %, based on the total weight of the composition. Fillers are generally added in larger amounts although the amount can range from as low as 0.01 or less to 65 or more wt %, based on the total weight of the composition.

Illustrative examples of fillers include, but are not limited to, clays, precipitated silica and silicates, fumed silica, talc, titanium dioxide, calcium carbonate, ground minerals, aluminum trihydroxide, magnesium hydroxide, and carbon blacks with typical arithmetic mean particle sizes larger than 15 nanometers (nm).

Exemplary antioxidants include hindered phenols (e.g., tetrakis [methylene (3,5-di-t-butyl-4-hydroxyhydrocinnamate)]methane); phosphites and phosphorites (e.g., tris(2,4-di-t-butylphenyl)phosphate); thio compounds (e.g., dilaurylthiodipropionate); various siloxanes; and various amines (e.g., polymerized 2,2,4-trimethyl-1,2-dihydroquinoline). Antioxidants can be used in amounts of 0.1 to 5 wt %, based on the total weight of the composition. In the formation of wire and cable compositions, antioxidants are typically added to the system before processing (i.e., prior to extrusion and cross-linking) of the finished article.

Examples of suitable flame retardants include, but are not limited to, magnesium hydroxide, aluminum trihydroxide (ATH), calcium phosphate, titanium oxide, zinc oxide, magnesium carbonate, barium sulfate, barium borate, kaolinite, silica, among others. In embodiments, the composition includes 20 to 60 vol % of one or more flame retardants, based on the total volume of the composition.

Compounding

Embodiments of the invention concern blends of the first and second interpolymers and a peroxide free-radical initiator (the "interpolymer blend"). The compositions can be prepared by conventional or hereafter discovered melt compounding techniques that provide a mixture of the components as described herein, using equipment such as, but not limited to, mixers for melt blending of the components, and equipment used for continuous mixing procedures including single and twin screw extruders, static mixers, as well as other machines and processes designed to provide a blend of the components.

In embodiments, blends of the first and second interpolymers can be prepared by melt compounding the first and second interpolymers and peroxide initiator at an elevated temperature to form an interpolymer blend. In embodiments, the melt temperature is greater than room temperature (i.e., 22° C.), but less than about 150° C., or 120° C., or 110° C. In embodiments, the interpolymer blend also includes a catalyst. Thereafter, the interpolymer blend can be extruded with melt filtration through a fine screen (e.g., 500 mesh) and optionally pelletized. In other embodiments, the peroxide initiator can be combined with one or both of the interpolymers via compounding or soaking prior to combination of the two interpolymers.

In embodiments, the first and second interpolymers can be combined in any concentration ratio suited to achieve desired results. In embodiments, the first interpolymer (comprising residues of a first comonomer having carboxylic acid and/or carboxylic acid anhydride functionality) can be present in the blend at a concentration of greater than 50 wt %, greater than 60 wt %, greater than 70 wt %, or greater than 75 wt %, based on the combined weight of the first and second interpolymer, with the balance being the second interpolymer (comprising residues of a second comonomer having epoxy functionality) at a concentration, respectively, of less than 50 wt %, less than 40 wt %, less than 30 w % or less than 25 wt %.

In embodiments, the first interpolymer can be present in the blend in an amount ranging from 60 to 95 wt %, or from 65 to 95 wt %, or from 75 to 95 wt %, or 75 to 90 wt %, based on the combined weight of the first and second interpolymer weight, with the balance being the second interpolymer in an amount ranging from 40 to 5 wt %, or from 35 to 5 wt %, or from 25 to 5 wt %, or 25 to 10 wt %, respectively. In other embodiments, the first and second interpolymers may each range from 5 wt % to 95 wt %, for a combined total of up to 100% of the polymeric components of the composition.

In embodiments, the concentration of the first interpolymer, in the composition, can range from 5, or from 10, or from 20, or from 30, or from 40, or from 50, or from 55, or from 60, up to 95, or up to less than (<) 95, or up to 94.995, or up to 94.99, or up to 90, or up to 85, or up to 80, or up to 75, or up to 70, wt %, based on the total weight of the composition. In embodiments, the first interpolymer is present in an amount of 5 to 95, or 5 to <95, or 5 to 94.995, or 5 to 94.99, or 10 to 90, or 20 to 85, or 30 to 80, or 40 to 75, or 50 to 70, wt %, based on the total weight of the composition.

In embodiments, the concentration of the second interpolymer, in the composition, can range from 5, or from 10, or from 20, or from 30, or from 40, or from 50, or from 55, or from 60, up to 95, or up to less than (<) 95, or up to 94.995, or up to 94.99, or up to 90, or up to 85, or up to 80, or up to 75, or up to 70, wt %, based on the total weight of the composition. In embodiments, the first interpolymer is present in an amount of 5 to 95, or 5 to <95, or 5 to 94.995, or 5 to 94.99, or 10 to 90, or 20 to 85, or 30 to 80, or 40 to 75, or 50 to 70, wt %, based on the total weight of the composition.

In embodiments, the composition comprises from 5 to 95 wt %, or from 5 to less than (<) 95 wt %, or from 5 to 94.995 wt %, or from 5 to 94.99 wt % of the first interpolymer (or oligomer), from 5 to 95 wt %, or from 5 to less than (<) 95 wt %, or from 5 to 94.995 wt %, or from 5 to 94.99 wt % of the second interpolymer (or oligomer), and from 0.005 to 1.2 wt %, or greater than (>) 0.16 to 1.2 wt %, or from 0.18 to 4.0 wt % of the peroxide free-radical initiator, the wt % based on the total weight of the composition.

In embodiments, at least 50 volume percent ("vol %") of the interpolymer blend can be a homogeneous blend. As used herein, the term "homogenous blend" denotes a composition having no distinct interpolymer domains having an average diameter larger than 3 micrometers (μm). In embodiments, a homogenous blend of the first and second interpolymers has no distinct domains of either interpolymer larger than 2 μm, or larger than 1 μm. Domains of the interpolymers can be assessed by microscopy techniques, such as FTIR microscopy, atomic force microscopy, scanning electron microscopy, transmission electron microscopy, and other methods known to those skilled in the art. In embodiments, at least 60 vol %, at least 70 vol %, at least 80 vol %, at least 90 vol %, substantially all, or all (i.e., 100 vol %) of the interpolymer blend is a homogeneous blend.

In embodiments, when the first and second interpolymers and peroxide initiator are incorporated into a blend in the absence of a crosslinking catalyst and stored at room temperature (i.e., 22° C.), the blend can exhibit little if any initial crosslinking. In embodiments, from the time the homogenous blend of the first and second interpolymers and peroxide initiator is achieved (designated "$T_b$"), the blend can exhibit a gel content of less than 50%, 30%, or 10% for up to sixty minutes past $T_b$ (designated "$T_b+60$") at a temperature that is less than or equal to the blending temperature. Gel content can be determined according to ASTM D2765.

In embodiments, crosslinking of the first and second interpolymers can be performed in a curing zone having a temperature of at least 175° C. up to a maximum of about 260° C. Additionally, the interpolymers can be cured for a time ranging from 2 minutes to about 30 minutes. In various embodiments, the curing zone can be a hot nitrogen or hot steam tube.

In embodiments, the extent of crosslinking of the material can be determined via analysis on a moving die rheometer or dynamic mechanical analyzer at 200° C., and extent of scorch retardance at 140° C. Crosslinking extent can be determined by the method described in ISO 6502. Upon analysis, an increase in torque, as indicated by the difference between the maximum torque ("MH") and the minimum torque ("ML") ("MH–ML"), indicates greater degree of crosslinking. In various embodiments, the crosslinked interpolymers have an MH–ML at 200° C. of at least 0.4 inch-pounds (0.045 Newton meter ("Nm")), at least 0.6 inch-pounds (0.068 Nm), at least 0.8 inch-pounds (0.090 Nm), at least 1 inch-pounds (0.113 Nm), at least 1.2 inch-pounds (0.136 Nm), at least 2 inch-pounds (0.226 Nm), at least 3 inch-pounds (0.339 Nm) or at least 4 inch-pounds (0.452 Nm), up to a maximum MH–ML of 15 inch-pounds.

In embodiments, the degree of crosslinking of the material can be measured by dissolving the composition in a solvent (e.g., xylene or decalin) for a specified duration, and calculating the percent gel or unextractable component, as determined according to ASTM D2765. In general, the percent gel typically increases with increasing crosslinking levels. In embodiments, the composition is crosslinked to a degree so as to provide a cured article having a percent gel content of at least 30 wt %, or at least 50 wt %, at least 70 wt % or at least 90 wt %, and up to 100 wt %, based on the total weight of the composition.

Without being bound by theory, having the functionality of the first and second comonomers incorporated into interpolymers has advantages in terms of low volatiles after crosslinking (even if the crosslinking reaction is not 100% complete), and requires little or no degassing after crosslinking. In addition, the inclusion of a peroxide initiator at an amount of at least 0.05 wt %, based on the total weight of the composition, and a crosslinking catalyst, provides a faster cure of the interpolymer composition that does not include a peroxide initiator.

In embodiments, the interpolymer blends comprising a peroxide initiator and crosslinking catalyst, when subjected to crosslinking conditions at 200° C., cure to a gel content of >50 wt % within less than 2.00 minutes, or less than 1.50 minutes, or less than 1.13 minutes, as determined by the method described in ISO 6502.

In various embodiments, the at least partially crosslinked interpolymer blend has a volatiles content of less than 1.5, less than 1.0, less than 0.5, less than 0.1, or less than 0.01, wt %, based on the total weight of the composition.

In embodiments, the volatiles content is measured by the weight loss of the crosslinked sample via thermogravimetric analysis ("TGA") in a nitrogen atmosphere. For example, the change in sample mass can be followed upon heating of a crosslinked sample at 10° C./min from 30° C. to 200° C. and then holding at 200° C. for 60 minutes. The amount of weight loss indicates the volatiles content of the crosslinked material.

Illustrative examples of volatiles include water, methane, acetophenone, cumyl alcohol, and alpha-methylstyrene, among others. In embodiments, the at least partially cross-linked interpolymer blend has a combined concentration of water, methane, acetophenone, cumyl alcohol, and alpha-methylstyrene of less than 1.5, less than 1.0, less than 0.5, less than 0.1, or less than 0.01 wt %. Such volatiles concentrations can be achieved without degassing the disclosed at least partially crosslinked interpolymer blend.

Articles of Manufacture

The compositions of the present invention may be used to prepare a variety of articles of manufacture, or their component parts or portions thereof. In embodiments, the composition including a crosslinking agent can be fabricated into an article and the temperature raised to allow the crosslinking of the composition.

The inventive compositions may be processed into an article by any one of a number of conventional techniques and apparatus. Illustrative processes include, but are not limited to, injection molding, extrusion molding, thermoforming, compression molding, rotomolding, slush molding, over molding, insert molding, blow molding, calendering, and other processing techniques that are well known to those skilled in the art. Films, including multi-layer films, may be produced by cast or entering process, including blown film processes.

Articles include, but are not limited to, sheets, molded goods and extruded parts. Additional articles include automotive parts, weather strips, belts, hoses, wire and cable jacketing and insulations including flame retardant versions (e.g., insulated cable), cable accessories, seals, tire components, computer parts, building materials, among other applications.

In various embodiments, the interpolymer blend can be employed in preparing polymer coatings (e.g., insulation and/or jackets) for wires and/or cables. Compounding of a cable polymeric coating material, such as insulation, can be effected by standard equipment known to those skilled in the art. Examples of compounding equipment are internal batch mixers, such as a Banbury™ or Bolling™ internal mixer. Alternatively, continuous single, or twin screw, mixers can be used, such as a Farrel™ continuous mixer, a Werner and Pfleiderer™ twin screw mixer, or a Buss™ kneading continuous extruder.

In various embodiments, an insulated cable comprising a conductor and an insulation layer comprising an at least partially cross-linked polymeric network, can be prepared employing the above-described interpolymer blend. In an embodiment, a conductor can be at least partially surrounded with at least a portion of the cross-linkable material, and at least a portion of the cross-linkable material can be crosslinked to provide the crosslinked insulation material. A cable containing an insulation layer comprising the interpolymer blend can be prepared with various types of extruders (e.g., single or twin screw types). A description of a conventional extruder can be found in U.S. Pat. No. 4,857,600. An example of co-extrusion and an extruder therefore can be found in U.S. Pat. No. 5,575,965. In an embodiment, the cross-linkable material and the conductor can be co-extruded to produce an extruded intermediate cable.

Following extrusion, the extruded intermediate cable can pass into a heated cure zone downstream of the extrusion die to aid in cross-linking the interpolymer blend or terpolymer in the presence of the above-described cross-linking catalyst. In embodiments, the crosslinkable material can be crosslinked by passing the extrudable intermediate cable through a curing zone having a temperature of at least 175° C. In embodiments, the heated cure zone can be maintained at a temperature in the range of 175 to 260° C. The heated zone can be heated by pressurized steam or inductively heated by pressurized nitrogen gas.

Following extrusion and crosslinking, the cable can be jacketed employing known cable manufacturing processes. In various embodiments, the cable does not undergo any degassing processes prior to such jacketing. Alternately, the jacket can be extruded along with the conductor and insulation material simultaneously, which heretofore was not possible with crosslinkable insulation due to degassing requirements for the insulation material.

Alternating current cables prepared according to the present disclosure can be low voltage, medium voltage, high voltage, or extra-high voltage cables. Further, direct current cables prepared according to the present disclosure include high or extra-high voltage cables.

DEFINITIONS

Unless stated to the contrary, implicit from the context, or customary in the art, all parts and percents are based on weight, and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

"And/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Cable" and "power cable," mean at least one wire or optical fiber within at least one polymeric coating material, e.g., an insulation covering or a protective outer jacket. Typically, a cable is two or more wires or optical fibers bound together, typically in a common insulation covering and/or protective jacket. The individual wires or fibers inside the polymeric coating material may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Composition" and like terms, as used herein, mean a mixture or blend of two or more components.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Conductor" and like terms, as used herein, denotes one or more wire(s) or fiber(s) for conducting heat, light, and/or electricity. A conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Crosslinked," "cured," and like terms, as used herein, refer to a composition or component of the composition that was subjected or exposed to a treatment which induced crosslinking to provide a composition or component having a gel content of 50 to 100 wt % insolubles. The degree of crosslinking may be measured according to ASTM 2765-84 by dissolving the composition or component in a solvent that dissolves the composition or component prior to crosslinking (e.g., xylene or decalene) for a specified duration, and calculating the percent gel or unextractable component. The percent gel content normally increases with increasing crosslinking levels.

"Ethylene-based polymer," "ethylene-based interpolymer," and like terms, as used herein, refers to a polymer that comprises, in polymerized form, a majority weight percent (wt %) (i.e., >50 wt %) of ethylene (based on the weight of the polymer), and at least one comonomer.

"Homogenous blend," as used herein, refers to a composition having no distinct interpolymer domains having an average diameter larger than 3 micrometers ("µm").

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (at least three different monomers) and tetrapolymers (at least four different monomers). Interpolymers also include polymers prepared by grafting an unsaturated comonomer to a polymer. For example, an ethylene polymer, such as LDPE, can be melt mixed with and unsaturated comonomer, such as maleic anhydride, acrylic acid, allyl glycidyl ether, or glycidyl methacrylate in the presence of a peroxide or other free radical initiator to form interpolymers.

"Polymer" and like terms, as used herein, refer to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined herein. Trace amounts of impurities, such as catalyst residues, can be incorporated into and/or within the polymer.

"Residue" and like terms, as used herein, when referring to a monomer, means that portion of a monomer molecule which resides in a polymer molecule as a result of being polymerized with or grafted to another monomer or comonomer molecule to make the polymer molecule.

"Substantially all" and like terms, as used herein, excludes any non-specified component having a concentration greater than 100 parts per million by weight ("ppmw").

"Wire" and like terms, as used herein, means a single strand of conductive metal, e.g., copper or aluminum, or a single strand of optical fiber.

Test Methods

Density.

Polymer densities in g/cm$^3$, as provided herein, are determined according to ASTM International ("ASTM") method D792.

Gel Content.

Gel content (insoluble fraction) is determined by extraction in boiling decalin at 180° C. for 5 hours according to ASTM D2765.

Melt Index.

Melt indices ($I_2$) provided herein are determined according to ASTM method D-1238. Unless otherwise noted, melt indices ($I_2$) are determined at 190° C./2.16 kg, and reported in grams eluted per 10 minutes, or decagrams (dg) eluted per minute.

Polydispersity Index (PDI) or Molecular Weight Distribution (MWD).

"Polydispersity index" (PDI) or "Molecular weight distribution" (MWD) is the weight average molecular weight/number average molecular weight ($M_w/M_n$), as determined by gel permeation chromatography. Molecular weight ($M_w$) is expressed as g/mol.

EXAMPLES

Materials

In the Examples detailed below, the following materials are employed:

TABLE 1

Materials

| | Component | Description | Properties |
|---|---|---|---|
| A | Anhydride-functionalized | LOTADER ™ 3210 (poly(ethylene-co-butyl acrylate- | Melt index (190° C./2.16 kg) = 5 g/10 min. Butyl acrylate content = 6 wt %. |

TABLE 1-continued

Materials

| | Component | Description | Properties |
|---|---|---|---|
| | polyethylene | co-maleic anhydride random terpolymer) (Arkema, Inc.) | Maleic anhydride content = 3.1 wt %. (wt % based on total weight of terpolymer) |
| B | Epoxy-functionalized polyethylene | LOTADER ™ AX 8840 (poly(ethylene-co-glycidyl methacrylate) random copolymer) (Arkema, Inc.) | Melt index (190° C./2.16 kg) = 5 g/10 min. Glycidyl methacrylate content = 8 wt %. (wt % based on total weight of copolymer) |
| C | Catalyst | 4-methyl-2-phenylimidazole, MPI (CAS 827-43-0) (Sigma-Aldrich Co. LLC.) | |
| D | Peroxide concentrate blend | ENDURANCE ™ HFDB 4201 (LDPE homopolymer)(The Dow Chemical Company), 1.8 wt % dicumyl peroxide, and 0.5 wt % antioxidants. | HFDB 4201 Melt index (190° C./2.16 kg)~2.3 g/10 min. |

Study 1

The following study was conducted to evaluate the cure of samples using a conventional peroxide initiated crosslinking reaction versus the cure of samples using a hybrid curing system through peroxide and epoxy/anhydride initiated crosslinking reactions according to the invention.

Sample Preparation

Polymer blends are prepared according to the formulations provided in Table 2, below, using a DSM Xplore® twin screw micro-compounder. The micro-compounder is initiated with a rotor speed of 30 rpm at a set point of 220° C. The pre-weighed amount of Component "A" anhydride functionalized PE terpolymer (LOTADER™ 3210) is added into the rotating mixing rotors of the micro-compounder under $N_2$ purging. After being heated at 220° C. for 30 minutes, the Component "A" terpolymer material is cooled down to 115° C. Subsequently, the Component "B" epoxy-functionalized PE copolymer (LOTADER™ AX 8840) copolymer is added and blended with the Component "A" terpolymer at 30 rpm for 3 minutes. The Component "C" MPI catalyst is then added and the composite is blended at 30 rpm for 5 minutes. The Component "D" peroxide concentrate blend (HFDB 4201) is then added and the composite is blended at 30 rpm for 5 minutes. The DSM compound is the stopped, and the samples are collected. Using a Carver press, the polymer blend samples are molded to 2 mm and 0.1 mm thick polymer films. The molding temperature is 115° C. and the applied molding pressure was 20,000 psi. Overall molding process time is less than 3 min.

Table 2 summarizes the formulations of the four test samples (TS1, TS2, TS3, TS4) according to the invention, and two comparative samples (CS1, CS2).

TABLE 2

| Component (wt %) | CS1 | CS2 | TS1 | TS2 | TS3 | TS4 |
|---|---|---|---|---|---|---|
| (A) anhydride functionalized PE (LOTADER ™ 3210) | 64.29 | 64.19 | 64.08 | 64.12 | 37.45 | 84.02 |
| (B) epoxy-functionalized PE (LOTADER ™ AX 8840) | 35.60 | 35.54 | 35.49 | 35.51 | 62.01 | 15.48 |
| (C) MPI catalyst | 0.11 | 0.11 | 0.11 | 0.11 | 0.19 | 0.14 |
| (D) peroxide added via concentrate | — | 0.16 | 0.32 | 0.27 | 0.36 | 0.36 |
| Molar ratio of A:B:C (HFDB 4201 weight content, %) | 240:240:8 | 240:240:8 (10%) | 240:240:8 (20%) | 240:240:8 (15%) | 80:240:8 (20%) | 240:80:8 (20%) |
| Cure level (storage modulus at 1.1 min., 200° C.), Pa | 10,100 | 7,717 | 22,540 | 37,292 | 21,996 | 59,686 |
| Scorch level (storage modulus at 40 min., 140° C.), Pa | 74,350 | NM | 85,950 | 108,632 | 73,146 | 177,505 |
| Cure-scorch balance (Cure level/Scorch level) | 0.14 | NM | 0.26 | 0.34 | 0.30 | 0.34 |

Comparative sample CS1 was cured solely through an epoxy/anhydride crosslinking reaction. By comparison, inventive samples TS1 through TS4 were cured using a hybrid curing system through peroxide and epoxy/anhydride initiated crosslinking reactions.

Cure-Scorch Balance.

Cure-scorch balance was determined by dividing the cure level by the scorch level. In general, for a given level of scorch, a higher level of cure is desired, and thus a high cure-scorch balance is desirable.

Cure level and scorch level are in units of Pascal (Pa), as determined by storage modulus via dynamic mechanical analysis (DMA). The extent of crosslinking ("cure level") in the samples was determined via DMA analysis on a TA Instruments AR-G2 rheometer at 1.1 minutes and 200° C., which is the typical temperature in a CV tube, and typical time period required to reach a 90% cure (T90) using a conventional peroxide-initiated crosslinking reaction of insulation materials in a rheometer at 200° C. Upon analysis, an increase in storage modulus, as indicated by the difference between the maximum storage modulus and the minimum storage modulus, indicates a greater degree of crosslinking.

The extent of scorching ("scorch level") was determined on a AR-G2 rheometer at 40 minutes and 140° C., which is the typical temperature used for cable extrusion, and typical time period for scorch using a conventional peroxide-initiated crosslinking reaction of insulation materials in a rheometer at 140° C.

The results in Table 2 show that the use of a hybrid peroxide and epoxy/anhydride initiated crosslinking system in TS1 through TS4 resulted in a disproportionate increase in ultimate cure (i.e., 90% cure) compared to the level of scorch, and thus a much greater balance between scorch and ultimate cure (i.e., cure-scorch balance) than the comparative sample CS1, which used a epoxy/anhydride initiated crosslinking system alone.

Peroxide Level.

Comparative sample CS2 and test samples TS1 through TS4 were cured using a hybrid curing system according to the invention through peroxide and epoxy/anhydride initiated crosslinking reactions, with peroxide initiator used in the test samples (i.e., 0.16 to 0.36 wt % peroxide based on the total weight of the composition).

The results further show that when a low amount of peroxide is used as part of a hybrid peroxide and epoxy/anhydride initiated curing system (i.e., 0.16 wt % peroxide based on the total weight of the composition), an insufficient cure is obtained as indicated by the very low cure level of comparative sample CS2.

Study 2

The following study was conducted to assess the volatiles (byproduct) content of samples that were cured using a conventional peroxide initiated crosslinking reaction (CS3) versus samples that were cured using a hybrid curing system according to the invention, through peroxide and epoxy/anhydride initiated crosslinking reactions.

Sample Preparation

Polymer blends are prepared as shown in Table 3, using a DSM Xplore® twin screw micro-compounder. The micro-compounder is initiated with a rotor speed of 30 rpm at a set point of 200° C. The pre-weighed amount of the Component "A" anhydride functionalized PE terpolymer (LOTADER™ 3210) is added into the rotating mixing rotors of the micro-compounder under $N^2$ purging. After being heated for 30 minutes, the Component "A" terpolymer (LOTADER™ 3210) is cooled down to 120° C. Subsequently, the Component "B" epoxy-functionalized PE copolymer (LOTADER™ AX 8840), Component "C" MPI catalyst (for sample TS5), and the Component "D" peroxide concentrate, are added to the Component "A" terpolymer (LOTADER™ 3210) material. The polymer blends are compounded at 120° C. for 5 minutes. The blend sample is then extruded out the micro-compounder and stored under anhydrous condition.

Compression Molding to Prepare Plaques for DMA Analysis

Using a Carver laboratory press, a portion of each of the polymer blend samples is compression molded to a 2 mm×0.1 mm thick polymer film and cured. The molding temperature is 115° C. and the applied molding pressure is 20,000 psi. Overall molding process time is generally less than 3 min.

Table 3 summarizes the formulations of the test samples TS5 and TS6 cured using a hybrid curing system according to the invention, and comparative sample CS3 cured solely through a peroxide initiated crosslinking reaction.

TABLE 3

| Component (wt %) | CS3 | TS5 | TS6 |
|---|---|---|---|
| (A) anhydride functionalized PE (LOTADER ™ 3210) | — | 64.08 | 64.08 |
| (B) epoxy-functionalized PE (LOTADER ™ AX 8840) | — | 35.49 | 35.49 |
| (C) MPI catalyst | — | 0.00 | 0.11 |
| (D) peroxide concentrate (Blend of LDPE homopolymer ENDURANCE ™ HFDB 4201, and dicumyl peroxide) | 1.6 (HFDB-4201 100%) | 0.32 (HFDB-4201 20%) | 0.32 (HFDB-4201 20%) |
| Molar ratio of A:B:C (HFDB 4201 weight content, %) | (100%) | 240:240:0 (20%) | 240:240:8 (20%) |
| % Weight loss at T = 200° C. for 60 minutes | 1.60 | 0.25 | 0.25 |

Thermogravimetric Analysis (TGA) of Volatile Byproduct Content

To assess volatiles (byproduct) content of the crosslinked samples (CS3, TS5, TS6), the total weight loss of the samples is determined by thermogravimetric analysis (TGA), using a temperature ramp of 10° C./min. to 200° C., and holding the temperature at 200° C. for 60 minutes. The results are shown in the FIGURE.

The TGA data shows that samples TS5 and TS6, which were cured using a hybrid curing system according to the invention comprising peroxide and epoxy/anhydride initiated crosslinking reactions, had only a 0.25 wt % volatile byproduct content. This was an 84.38% reduction in volatile byproducts compared to sample CS3 which was crosslinked by a conventional peroxide initiated crosslinking reaction and had a 1.60 wt % volatile byproduct content.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A composition comprising
   A. a first interpolymer or oligomer comprising ethylene monomer residues and residues of a first comonomer having one or more functionalities selected from the group consisting of carboxylic acid and carboxylic acid anhydride;
   B. a second interpolymer or oligomer comprising ethylene monomer residues and residues of a second comonomer having epoxide functionality; and
   C. from 0.18 to 0.40 wt % of a peroxide free-radical initiator; and
   D. a crosslinking catalyst.

2. The composition of claim 1, comprising:
   from 5 to 94.995 wt % of the first interpolymer or oligomer;
   from 5 to 94.995 wt % of the second interpolymer or oligomer; and
   from 0.18 to 0.40 wt % of the peroxide free-radical initiator;
   the wt % based on the total weight of the composition.

3. The composition of claim 1, comprising from 0.005 to 1.2 wt % of the catalyst.

4. The composition of claim 1, wherein the catalyst to epoxide molar ratio ranges from 1:240 to 2:15.

5. The composition of claim 1, wherein:
the first interpolymer has an anhydride content of from 0.1 to 10 wt %; and
the second interpolymer has an epoxide content of from 0.1 to 10 wt %.

6. The composition of claim 1, wherein the epoxide to anhydride molar ratio ranges from 12:1 to 1:12.

7. The composition of claim 1, wherein:
the first comonomer comprises acrylic acid, methacrylic acid, or maleic anhydride, or a combination thereof; and
the second comonomer comprises glycidyl acrylate, glycidyl methacrylate, or allyl glycidyl ether, or a combination thereof.

8. The composition of claim 1, wherein the first interpolymer comprises from 1 to 10 wt % of residues of the first comonomer, and the second interpolymer comprises from 1 to 10 wt % of residues of the second comonomer.

9. A crosslinked composition formed from the composition of claim 1.

10. The crosslinked composition of claim 9, having a volatiles content of less than 1.0 wt %.

11. An article comprising at least one component formed from the composition of claim 1.

12. A process for preparing a crosslinked insulation material, the process comprising:
crosslinking at least a portion of a crosslinkable material comprising the composition of claim 1 at a temperature of 175° C. to 260° C. to provide a crosslinked insulation material.

13. The process of claim 12, wherein the composition has a gel content of >50 wt % within less than 1.5 minutes at a cure temperature of 200° C., as measured according to ISO 6502.

14. The composition of claim 1, wherein the catalyst is selected from the group consisting of imidazoles, substituted imidazoles, imidazoliums, substituted imidazoliums, phosphines, phosphoniums, ammonium compounds, and a combination thereof.

15. The composition of claim 14, wherein the catalyst is selected from the group consisting of 1-methylimidazole, 2-methylimidazole, 4-methyl-2-phenylimidazole, 3-ethyl-1-methylimidazolium chloride, 1,3 dimethylimidazolium chloride, ethyltriphenylphosphonium, benzyltrimethylammonium chloride, and a combination thereof.

16. The composition of claim 15, wherein the catalyst is 4-methyl-2-phenylimidazole.

17. The composition of claim 16, comprising
from 0.18 to 0.40 wt % of the peroxide free-radical initiator; and
from 0.005 to less than 1.2 wt % of the catalyst.

18. The composition of claim 17, comprising
from 0.18 to 0.40 wt % of the peroxide free-radical initiator and
from 0.1 to 1 wt % of the catalyst.

19. The composition of claim 18, wherein the composition has a ratio of a cure level to a scorch level from 0.26 to 0.34.

* * * * *